United States Patent [19]

Leeman et al.

[11] 3,912,711

[45] Oct. 14, 1975

[54] SYNTHETICALLY PRODUCED UNDECAPEPTIDE, SUBSTANCE P

[76] Inventors: Susan E. Leeman, 139 Park St., Newton, Mass. 02159; Michael Moon Ki Chang, 16619 Marquey Terrace, Pacific Palisades, Calif. 90272; Geoffrey W. Tregear, 42 Lawrence Road, Chestnut Hill, Mass. 02167; Hugh D. Niall, University of Melbourne, Parkville, Victoria, Australia, 03052

[22] Filed: July 3, 1972

[21] Appl. No.: 268,679

[52] U.S. Cl. ............................. 260/112.5; 424/177
[51] Int. Cl.² ................. C07C 103/52; A61K 37/00
[58] Field of Search ................................ 260/112.5

[56] References Cited
OTHER PUBLICATIONS

Chang et al.: Nature New Biol., 232, 86–87 (1971); cited from Chem. Abstr. 75: 84245t.
Tregear et al.: Nature New Biol., 232, 87–89 (1971); cited from Chem. Abstr. 75: 98801h.
Iselin: Helv. Chim. Acta, 44, 61–78 (1961).

*Primary Examiner*—Elbert L. Roberts
*Assistant Examiner*—Reginald J. Suyat
*Attorney, Agent, or Firm*—Salvatore C. Mitri

[57] ABSTRACT

A polypeptide L arginyl-L prolyl-L lysyl-L prolyl-L glutaminyl-L glutaminyl-L phenylalanyl-L phenylalanyl-L glycyl-L leucyl-L methionine amide. The polypeptide is synthesized by building up the peptide chain while anchoring one end with a resin. After the polypeptide chain is completed it is cleaved from the resin. This synthesis is carried out in a solid phase procedure where excess reagents can be easily removed by washing. Alternatively, standard solution phase procedures for building polypeptide chains can be used in the synthesis.

2 Claims, 3 Drawing Figures

SYNTHETICALLY PRODUCED UNDECAPEPTIDE, SUBSTANCE P

The invention described herein was made in the course of work under a grant or award from the Department of Health, Education, and Welfare.

BACKGROUND OF THE INVENTION

It has long been known that extracts of various equine tissues and particularly brain and intestine tissues contain a substance that when injected intravenously into mammals such as rabbits, rats, and the like, lowers arterial blood pressure and stimulates the contraction of intestinal tissue in vitro. Since at least 1931, workers in the art have expended considerable efforts in attempting to isolate and identify the substance in such extracts which causes lowered arterial blood pressure. However, the substance could not be isolated, purified and identified until very recently.

In a first article appearing in the *Journal of Biological Chemistry*, Volume 245, No. 18, September 25, (Michael M. Chang, Susan E. Leeman), pp. 4784–4790, (1970) entitled *Isolation of a Sialogogic Peptide from Bovine Hypothalamic Tissue and its Characterization as Substance P*, an isolation of Substance P from bovine hypothalami is described. This naturally occurring Substance P exhibits lowering of mammalian arterial blood pressure, stimulation of salivation and stimulation of intestinal contraction when injected into mammals. In two more recent articles appearing in *Nature New Biology* Vol. 232 dated July 21, 1971, entitled *Amino-acid Sequence of Substance P* (Michael M. Chang, Susan E. Leeman, Hugh D. Niall) and *Synthesis of Substance P* (Geoffrey W. Tregear, Hugh D. Niall, John T. Potts, Susan E. Leeman, Michael M. Chang) pp. 86–89, the amino acid sequence of naturally occurring Substance P and a synthesis of a polypeptide is described. In the latter two papers, the physiological and biological activity of Substance P which occurs naturally, is linked to a polypeptide corresponding to the structure of L arginyl-L prolyl-L lysyl-L prolyl-L glutaminyl-L glutaminyl-L phenylalanyl-L phenylalanyl-L glycyl-L leucyl-L methionine amide.

SUMMARY OF THE INVENTION

It is a primary object of this invention to provide a polypeptide having a structural formula such that it lowers arterial blood pressure in mammals in vivo.

It is another object of this invention to provide a polypeptide in accordance with the preceding object and which has the structural formula L arginyl-L prolyl-L lysyl-L prolyl-L glutaminyl-L glutaminyl-L phenylalanyl-L phenylalanyl-L glycyl-L leucyl-L methionine amide.

It is a still further object of this invention to provide methods of synthesizing the polypeptide of the preceding objects.

According to the invention, a polypeptide is provided which when injected intravenously in mammals, lowers arterial blood pressure. The polypeptide is L arginyl-L prolyl-L lysyl-L prolyl-L glutaminyl-L glutaminyl-L phenylalanyl-L phenylalanyl-L glycyl-L leucyl-L methionine amide and variants thereof.

Moreover, this polypeptide does not have unwanted harmful side effects when used in mammals such as rabbits, rats, and others.

The polypeptide is preferably prepared and synthesized by providing a resin anchor and linking each amino acid into the polypeptide chain after which the anchor or resin is removed by cleaving. In each step comprising addition of additional amino acids, excess reagents are removed by washing. Alternatively, conventional classical known solution phase procedures for building up amino acid chains can be used.

It is a feature of this invention that the polypeptide which substantially has the biological activity of naturally occurring Substance P can be easily produced in quantity. Moreover, for the first time the biologically active and desirable structure of naturally occurring Substance P has been identified and substantially reproduced.

BRIEF DESCRIPTION OF THE DRAWINGS

The above and other objects, features and advantages of the present invention will be better understood from the following specification when read in conjunction with the accompanying drawings in which.

DESCRIPTION OF PREFERRED EMBODIMENTS

The advantageous polypeptide of this invention is useful as a vasodepressant to lower arterial blood pressure, stimulate gut contraction and stimulate salivary secretions. The polypeptide has the chain structure L arginyl-L prolyl-L lysyl-L prolyl-L glutaminyl-L glutaminyl-L phenylalanyl-L phenylalanyl-L glycyl-L leucyl-l methionine amide with the chemical formula shown below:

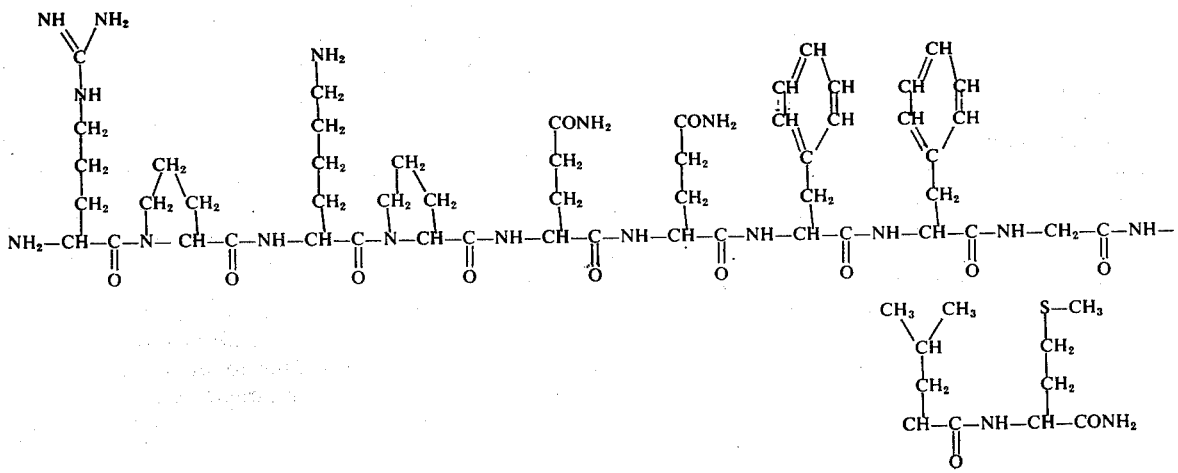

Figure 1:
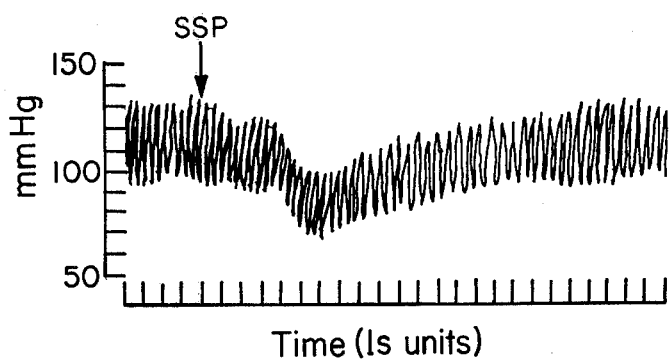
FIGS. 1 and 2 are graphs of the effect of the synthetic polypeptide of this invention and naturally occurring Substance P, respectively, on the arterial blood pressure of an anesthetized rat.
Figure 2:
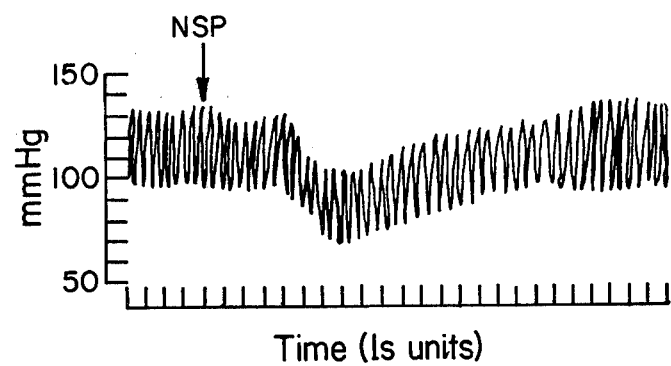
Figure 3:
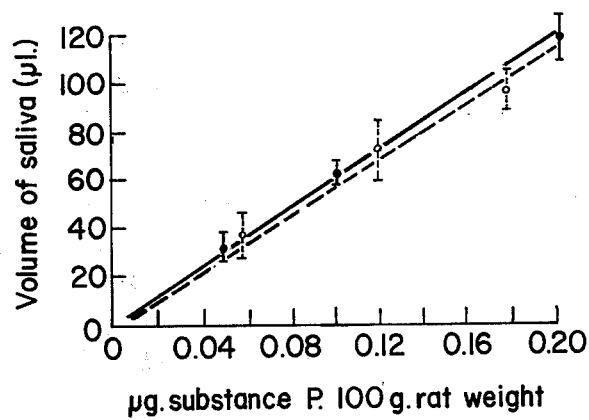
FIG. 3 is a comparison of the sialogogic activity of the synthetic polypeptide of this invention and naturally occurring Substance P.

As described in the articles in Nature New Biology discussed above, which are specifically incorporated herein by reference, this polypeptide has been tested with the results shown in FIGS. 1–3.

In FIGS. 1 and 2, the graphs compare the effect of the synthetic polypeptide of this invention to natural Substance P as isolated in accordance with the *Journal of Biological Chemistry* article noted above, which article is specifically incorporated herein by reference. The graph recordings were made using a 267 BC transducer attached to an 8805B carrier preamplifier (Hewlett-Packard Company) following cannulation of the carotid artery in rats weighing 250–300 grams and anesthetized with pentobarbital (50 mg/kg body weight). Test samples were injected through the jugular vein; (a) 0.3 μg/kg of synthetic Substance P (SSP — the polypeptide of this invention) injected at the arrow; (b) 0.3 μg/kg of natural Substance P (NSP) injected at the arrow. These graphs show substantial lowering of blood pressure in short time periods by the polypeptide of this invention.

FIG. 3 compares the sialogogic activity of the polypeptide of this invention (---) and natural (—) Substance P. Each point represents the mean ±s.d. for three determinations. All rats weighed between 90 and 120 grams and were injected with the polypeptides as described in connection with the results shown in FIGS. 1 and 2.

The polypeptide of this invention is preferably synthesized by solid phase procedures for synthesizing polypeptides. Thus, the amino acid chain of the polypeptide is built up using a resin as an anchor. Each amino acid is added in turn and excess reagents are removed by washing the solid intermediate product. After the chain is completed, the resin is removed by cleaving as known in the art. In a specific example of the synthesis, the following steps were carried out with all reactions at standard room temperature unless otherwise indicated:

Polystyrene crosslinked with 2% divinyl benzene in the form of the benzhydrylamine derivative (0.89 millimole of free amine groups per gram of polymer) (3.0g, 2.67 mmole $NH_2$) was transferred to a reaction vessel suitable for carrying out solid-phase peptide synthesis (see for example p. 66 in *Solid Phase Peptide Synthesis* by Stewart, J. M. and Young, J. D., Freeman Press, San Francisco, 1969) and washed several times with methylene chloride to swell the resin. t-Boc-L-methionine wherein t-Boc stands for N-tertiary butyloxycarbonyl (1.0 g, 4.0 mmole) was added to the swollen resin and sufficient methylene chloride added to dissolve the methionine and to just cover the resin. The mixture was shaken gently for a period of 10 minutes. N, N dicyclohexylcarbodiimide (1.66 ml of a 50% w/v solution in methylene chloride) was then added and the mixture shaken for a further 2 hours.

The mixture was then filtered and the resin washed with methylene chloride (4×15 ml) followed by N,N dimethyl formamide (4×15 ml). A solution of acetic anhydride (2.5 ml) and triethylamine (0.75 ml) in dimethylformamide (25 ml) was added and the mixture shaken for 20 minutes to acetylate any remaining amino group. The mixture was then filtered and the resin washed with dimethylformamide (4×15 ml) followed by methylene chloride (4×15 ml).

The following cycle of operations was carried out to add further amino acids to the chain.

1. A solution of trifluoroacetic acid in methylene chloride 30% v/v, ml was added to the resin and shaken for 2 minutes.
2. After filtering, a further 15 ml of trifluoroacetic acid reagent was added and the mixture shaken for 30 minutes to remove the t-Boc groups.
3. The mixture was then filtered and the resin washed with methylene chloride (4×15 ml).
4. A solution of triethylamine in methylene chloride 10% v/v, 15 ml was added to the resin and shaken for 2 minutes. This procedure was repeated twice.
5. A further 15 ml of triethylamine solution was added and the mixture shaken for 15 minutes to neutralize the resin.
6. The mixture was then filtered and the resin washed with methylene chloride (4×15 ml).
7. A solution of the appropriate t-Boc amino acid (6.5 milli mole) in methylene chloride (10 ml) was added and the mixture shaken for 10 minutes.
8. A solution of N,N dicyclohexylcarbodiimide in methylene chloride (50% w/v; 2.68 ml, 6.5 millimole) was added and the mixture stirred for 2 hours.
9. The mixture was filtered and the resin washed with methylene chloride (4×15 ml).
10. A small portion of the resin (approximately 5 mg) was removed and tested for completeness of reaction according to the method of Kaiser et al (Analytical Biochemistry 34:595,1970). If the test indicated that reaction was incomplete the coupling was repeated by returning to step 4. If the reaction was complete the next cycle of amino acid addition was commenced by starting again at step 1.

The following amino acids (in order) were added at step 7, t-Boc-L-Leucine, t-Boc-Glycine, t-Boc-L-Phenylalanine, and t-Boc-L-Phenylalanine.

The addition of glutamine required the following modification in the procedure. Steps 7 to 9 were replaced by the following:

7A. The resin was washed with dimethylformamide (4×15 ml)
8A. A solution of t-Boc-L-glutamine-p-nitrophenylester (4.7g, 13 mmole) dissolved in dimethylformamide was added to the resin and the mixture shaken overnight
9A. The mixture was filtered and the resin washed with dimethylformamide.

This procedure was repeated to incorporate the second glutamine into the chain.

The next amino acids in the sequence, t-Boc-L-Proline, t-Boc-E-carbobenzoxy-L-Lysine, t-Boc-L-Proline and t-Boc-L-Nitroarginine were added according to the procedure described in steps 1 to 10.

At the completion of the arginine reaction cycle, steps 1 to 6 were repeated to remove the final t-Boc group. The resin was then washed with methanol (4×15 ml) and dried in vacuo.

A portion of the resin-peptide (1.0g) was transferred to the reaction vessel of a hydrogen fluoride cleavage apparatus (see for example p. 42 of Stewart and Young reference cited above) and treated with hydrogen fluoride (10 ml) and anisole (2 ml) for 1 hour at 0°C. After removal of the excess hydrogen fluoride under vacuum the peptide-resin mixture was washed with ether (2×15 ml) on a sintered glass filter to remove anisole and the peptide extracted out with dilute acid. The acetic acid washings were combined, diluted with water and lyophilized to yield the crude peptide (415 mg).

The crude peptide was purified by gel-filtration on a "Biorad P2" column in 0.1M acetic acid. Aliquots of the column fractions were tested for sialogogic activity according to the method of Leeman and Hammerschlag (Endocrinology 81:40, 1967) and the active fractions pooled and lyophilized.

Further purification of the synthetic peptide by chromatography on 'Sephadex G-15' in 0.5 M acetic acid indicated that the peak of sialogogic activity occurred at an identical elution volume to that obtained for natural Substance P. Amino-acid analysis of the synthetic peptide after acid hydrolysis and total enzymic digestion gave the expected composition shown in Table 1.

Table 1 Amino-acid composition of synthetic Substance P

| Amino-acid | Theoretical | Molar ratios Acid hydrolysis | Enzymatic hydrolysis |
|---|---|---|---|
| Glutamic acid | 0 | 2.00 | — |
| Glutamine | 2 | — | 1.70 |
| Proline | 2 | 2.25 | 2.40 |
| Glycine | 1 | 0.85 | 1.10 |
| Methionine | 1 | 0.85 | 0.75 |
| Leucine | 1 | 0.80 | 1.05 |
| Phenylalanine | 2 | 2.05 | 1.95 |
| Lysine | 1 | 1.10 | 0.70 |
| Arginine | 1 | 1.05 | 1.00 |

High voltage paper electrophoresis (80 V/cm) of synthetic and natural Substance P was performed at pH 1.6 in formic acid-acetic-acid-water (15:10:75), pH 3.5 in pyridine-acetic acid-water (80:204:720). In these systems the synthetic and natural material behaved identically.

While specific examples of the invention have been described above, many variations are possible. For example, the particular organic resin used in the solid phase procedure as well as times, temperatures and the like may vary as known in the art. Temperatures can be raised above standard room temperature to accelerate reactions so long as such elevated temperatures are non-destructive to the reactants and final products. Synthesis can be carried out by a classical solution phase procedure as by linking one amino acid to another through a peptide link by using a coupling reagent and then separating the unwanted byproducts and repeating the procedure to build up the desired amino acid chain.

The specific dosage rates used can vary in different mammals such as man, rats and others to achieve lowering of arterial blood pressure and other wanted biological activity without unwanted side effects. Generally, a dosage rate of from 0.1 to 2 micrograms per kilogram of body weight gives useful results in mammals.

While the specific formulation of the polypeptide is as described above, variations which do not diminish desirable biological activity or cause unwanted side effects are possible. For example, the methionine amide terminal hydrocarbon can be a methionine sulfone amide. Thus, the sulfur atom of the amide has two oxygen atoms each bonded to it by double bonds as shown below:

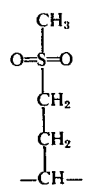

This modification of the polypeptide is found to exhibit biological activity higher than that of the unmodified polypeptide described above when injected into mammals at the dose rates indicated above.

We claim:

1. A synthetically produced undecapeptide, L-arginyl-L-prolyl-L-lysyl-L-prolyl-L-glutaminyl-L-glutaminyl-L-phenylalanyl-L-phenylalanyl-L-glycyl-L-leucyl-L-methionine amide, said undecapeptide having the same sialogogic function and arterial blood pressure lowering function when injected into mammals as naturally derived substance P.

2. A synthetically produced undecapeptide, L-arginyl-L-prolyl-L-lysyl-L-prolyl-L-glutaminyl-L-glutaminyl-L-phenylanyl-L-phenylalanyl-L-glycyl-L-leucyl-L-methionine sulfone amide, said undecapeptide exhibiting higher sialogogic and arterial blood pressure lowering functions as naturally derived substance P.

* * * * *